J. HUBLER.
PNEUMATIC ATTACHMENT FOR SCUTCHING MACHINES.
APPLICATION FILED SEPT. 14, 1917.
1,299,946.
Patented Apr. 8, 1919.
2 SHEETS—SHEET 2.
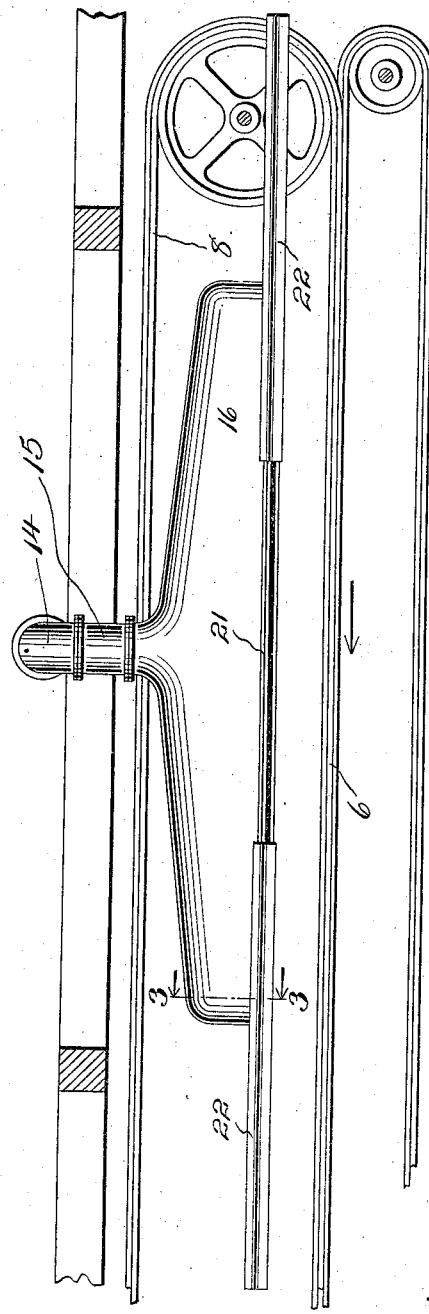
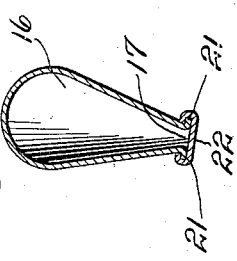

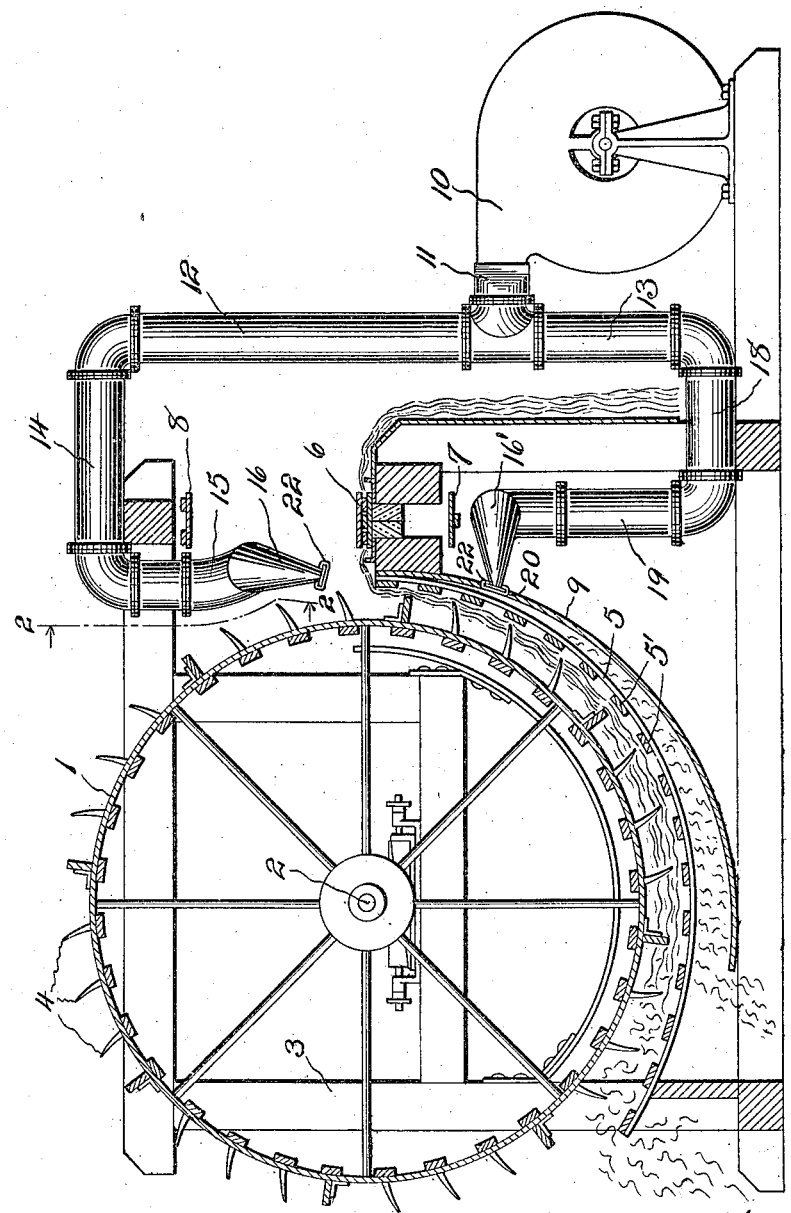

UNITED STATES PATENT OFFICE.

JOHN HUBLER, OF BRANDON, WISCONSIN.

PNEUMATIC ATTACHMENT FOR SCUTCHING-MACHINES.

1,299,946.  Specification of Letters Patent.  Patented Apr. 8, 1919.

Application filed September 14, 1917. Serial No. 191,423.

*To all whom it may concern:*

Be it known that I, JOHN HUBLER, a citizen of the United States, and resident of Brandon, in the county of Fond du Lac and State of Wisconsin, have invented certain new and useful Improvements in Pneumatic Attachments for Scutching-Machines; and I do hereby declare that the following is a full, clear, and exact description thereof.

This invention refers to improvements in the methods of separating the hurds from the line fibers and tow of hemp and similar plant growths.

Even with the most modern and scientific scutching machines it has been found extremely difficult to thoroughly remove the hurds and similar pithy material from hemp and like plants merely by a combing action on such plants. The most important object of the present invention is, therefore, to provide an attachment which will coöperate with the usual scutching drums of a scutching machine for more thoroughly removing the hurds.

Specifically it is an object to provide an arrangement for blowing upon the hemp while it is being scutched to separate the additional parts from the line fibers.

It is, also, an object to provide an arrangement in connection with the blowing apparatus for controlling the amount of air from the mouths of the blower heads.

With other and minor objects in view, the invention resides in the novel features of construction and the combination of parts, which will be hereinafter more particularly described and claimed.

In the accompanying drawings:

Figure 1 represents a vertical, transverse, sectional view through a scutching machine constructed in accordance with co-pending patent applications and having an improved pneumatic attachment connected therewith.

Fig. 2 is a vertical, longitudinal, sectional view taken substantially on the plane of the line 2—2 of Fig. 1, and Fig. 3 is a detail transverse section on the line 3—3 of Fig. 2.

Referring particularly to the accompanying drawings, it will be noted that portions of the scutching machine constructed in accordance with the co-pending applications, Serial Nos. 137,610, and 172,393, have been illustrated, the same consisting of a scutching drum 1, which is preferably solid and is held by spokes in spaced relation to a shaft 2, the latter in turn being journally mounted in suitable bearings supported in an end frame 3. The cylindrical scutching drum 1 carries a plurality of combing teeth 4, which coöperate with an arcuate slotted apron 5 disposed adjacent the underside of the drum.

The hemp or the like to be treated is passed to the scutching drums by means of a conveyer 6 formed of the pair of endless belts 7 and 8 substantially as shown in the above mentioned pending applications, it being pointed out in the first of said applications that scutching drums are preferably mounted on each side of the conveyer to alternately act upon the material which extends from opposite sides of the mechanism which grips and conveys the same.

For the purpose of the present invention a supplemental apron or guard 9 of arcuate cross sectional shape is disposed below the slotted apron 5 and is designed to form, together with the solid cylindrical scutching drum, a restricted throat through which air can be forced under considerable pressure. Such a force of air, it will be noted, will tend to force the material being scutched toward the interstices between the slots 5' of the apron 5. The line fibers, being of sufficient length to overlie several of the slats, will not be forced therebetween and through the apron, but the smaller material, such as the hurds, will be blown through said apron and thereby separated from the other parts of the hemp or the like.

This compressed air is furnished by means of the blower or blast fan 10 located at an appropriate point adjacent the scutching drum and is conveyed therefrom through a main trunk 11. The trunk is branched to provide upper and lower trunk sections 12 and 13 for the purpose of distributing air to two different points within the throat between the scutching drum and the guard 9.

The upper trunk section, after rising to a necessary height, is extended laterally, as at 14, and then downwardly, as at 15, where it is connected with an elongated head 16. This head 16 is disposed parallel to the axis of the scutching drum 1 and the mouth 17 thereof, which extends throughout its length, opens adjacent the upper end of the space or throat between said drum and the guard. By this arrangement compressed air is directed directly into the throat substantially throughout the length of the scutching drum, and as such air naturally seeks a means of escape, it eventually is forced between the slats of the apron.

The lower trunk section 13 is extended laterally as at 18 toward the guard 9 and then upwardly, as shown at 19, to a point adjacent the lower stretch of the endless belt 7. At this point the head 16' is secured thereto, said head being of similar size and shape to the head 16 with which it is designed to coöperate. The mouth of this head 16' is disposed so that the air therefrom will be forced through a slot 20 in the guard 9 adjacent the top thereof. The additional air thus provided is confined between the drum and the guard and acts similarly to the air from the first mentioned head.

Since it is sometimes not necessary to use the air throughout the length of a drum, means have been provided to regulate the force and the place of application of air from both of the heads. Each of the heads is constructed substantially alike and the longitudinal edges of the mouths 17 thereof are bent laterally, as at 21, to form tracks or guides on which slides 22 are adapted to move. The opposite longitudinal edges of the slides are channel-shaped for engagement with said tracks 21, whereby they may be effectively held on the head, yet readily moved longitudinally with respect thereto. From Fig. 2, it will be noted that a pair of slides is preferably provided for each head, the length of each of the slides being substantially one-half the length of the head upon which it is used. By moving the inner ends of the slides toward or away from each other, it will be readily seen that the opening of the throat will be controlled, thereby regulating not only the force of the air blast, but also the place of application with respect to the drum.

With the addition of such an arrangement the amount of scutching and combing usually necessary is practically cut in half. Therefore, the size of the scutching machine may be decreased, the same being particularly true of the drums, which may be materially shortened. The cost of construction and maintenance of a scutching machine will thereby be materially decreased and the floor space, which it has formerly occupied, considerably lessened.

I claim:—

1. A mechanism of the class described comprising in combination, a movable scutching drum, a relatively stationary guard adjacent the drum, the space between said guard and drum forming a restricted throat, a stationary slotted apron between said drum and guard for coöperation with the scutching portions of the former, and means for forcing a draft of air through said throat.

2. A mechanism of the class described comprising in combination, an elongated cylindrical scutching drum, a guard adjacent the drum and extending throughout the length thereof, the space between said guard and drum forming a restricted throat, the same extending from end to end of the drum, an elongated blower head disposed parallel to the opening of said throat and adjacent thereto, means for supplying air under pressure through said blower head, and means for regulating the flow of air from said head.

3. A mechanism of the class described comprising in combination, an elongated cylindrical scutching drum, a guard adjacent the drum and extending throughout the length thereof, the space between said guard and drum forming a restricted throat, the same extending from end to end of the drum, an elongated blower head disposed parallel to said throat and having a mouth extending throughout its length and disposed adjacent the opening of said throat, a slide movable over the mouth of the head to regulate the flow of air therefrom, and means for supplying air under pressure to said head.

4. A mechanism of the class described comprising in combination, a movable scutching drum, a relatively stationary guard adjacent the drum, the space between said guard and drum forming a restricted throat, a stationary slotted apron between said drum and guard for coöperation with the scutching portions of the former, and a longitudinally extending air discharge nozzle at the upper portion of the guard for forcing air between the guard and apron.

5. A mechanism of the class described comprising in combination, a movable scutching drum, a relatively stationary guard adjacent the drum, the space between said guard and drum forming a restricted throat, a stationary slotted apron between said drum and guard for coöperation with the scutching portions of the former, a longitudinally extending air discharge nozzle at the upper portion of the guard for forcing air between the guard and apron, and a second longitudinally extending air discharge nozzle located at the mouth of the throat for forcing air between the slotted apron and the drum.

6. A mechanism of the class described comprising in combination, a movable scutching arm, a relatively stationary guard adjacent the drum, the space between said guard and drum forming a restricted throat, a stationary slotted apron between said drum and guard for coöperation with the scutching portions of the former, a longitudinally extending air discharge nozzle at the upper portion of the guard for forcing air between the guard and apron, and means for moving work material through the throat in a direction parallel to the axis of rotation of the drum.

7. A mechanism of the class described comprising a rotatable scutching drum and a transversely arcuate guard adjacent the drum, one edge portion of the guard being spaced a greater distance from the drum than the other side portion whereby to define a throat taperingly increased in width, a transversely slotted arcuate apron between the drum and guard and having a curvature substantially concentric with the curvature of the drum and engaging the guard at the reduced portion of the throat, and a longitudinally extending air discharge nozzle adjacent the reduced portion of the throat for forcing a draft of air through said throat.

8. A mechanism of the class described comprising a rotatable scutching drum and a transversely arcuate guard adjacent the drum, one edge portion of the guard being spaced a greater distance from the drum than the other side portion whereby to define a throat taperingly increased in width, a transversely slotted arcuate apron between the drum and guard and having a curvature substantially concentric with the curvature of the drum and engaging the guard at the reduced portion of the throat, a longitudinally extending air discharge nozzle extending through the guard adjacent the restricted portion of the throat for discharging air between the slotted apron and guard, and a second longitudinally extending air supply nozzle for discharging air into the restricted portion of the throat between the slotted apron and the drum.

In testimony that I claim the foregoing I have hereunto set my hand at Milwaukee, in the county of Milwaukee and State of Wisconsin.

JOHN HUBLER.

Copies of this patent may be obtained for five cents each, by addressing the "Commissioner of Patents, Washington, D. C."